Figure 1:
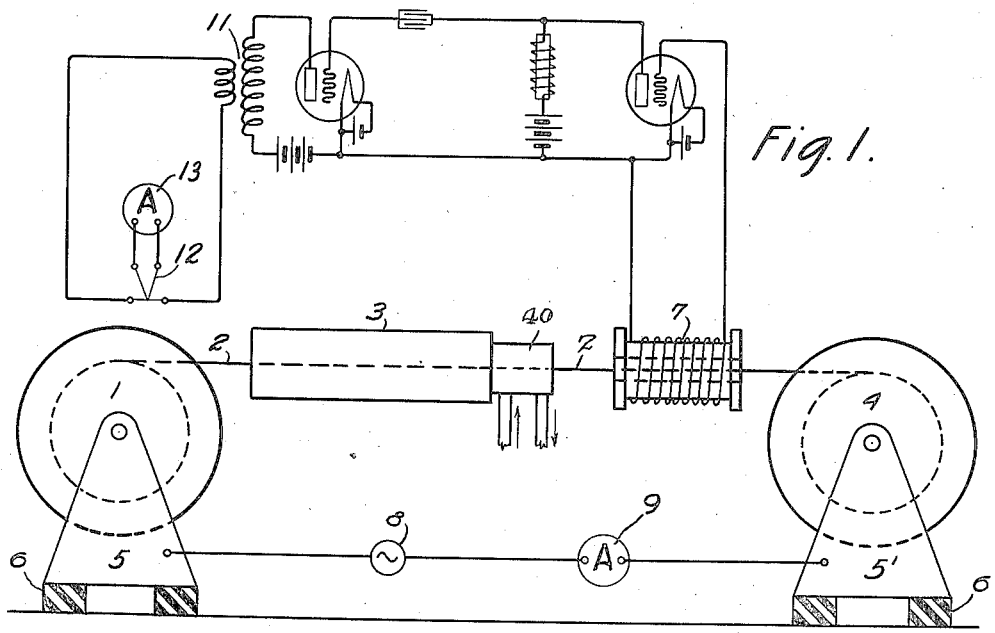

June 1, 1926.

O. E. BUCKLEY 1,586,962

INDUCTION APPARATUS

Filed Oct. 24, 1922   2 Sheets-Sheet 1

Inventor:
Oliver E. Buckley
by O. C. Sprague, Atty

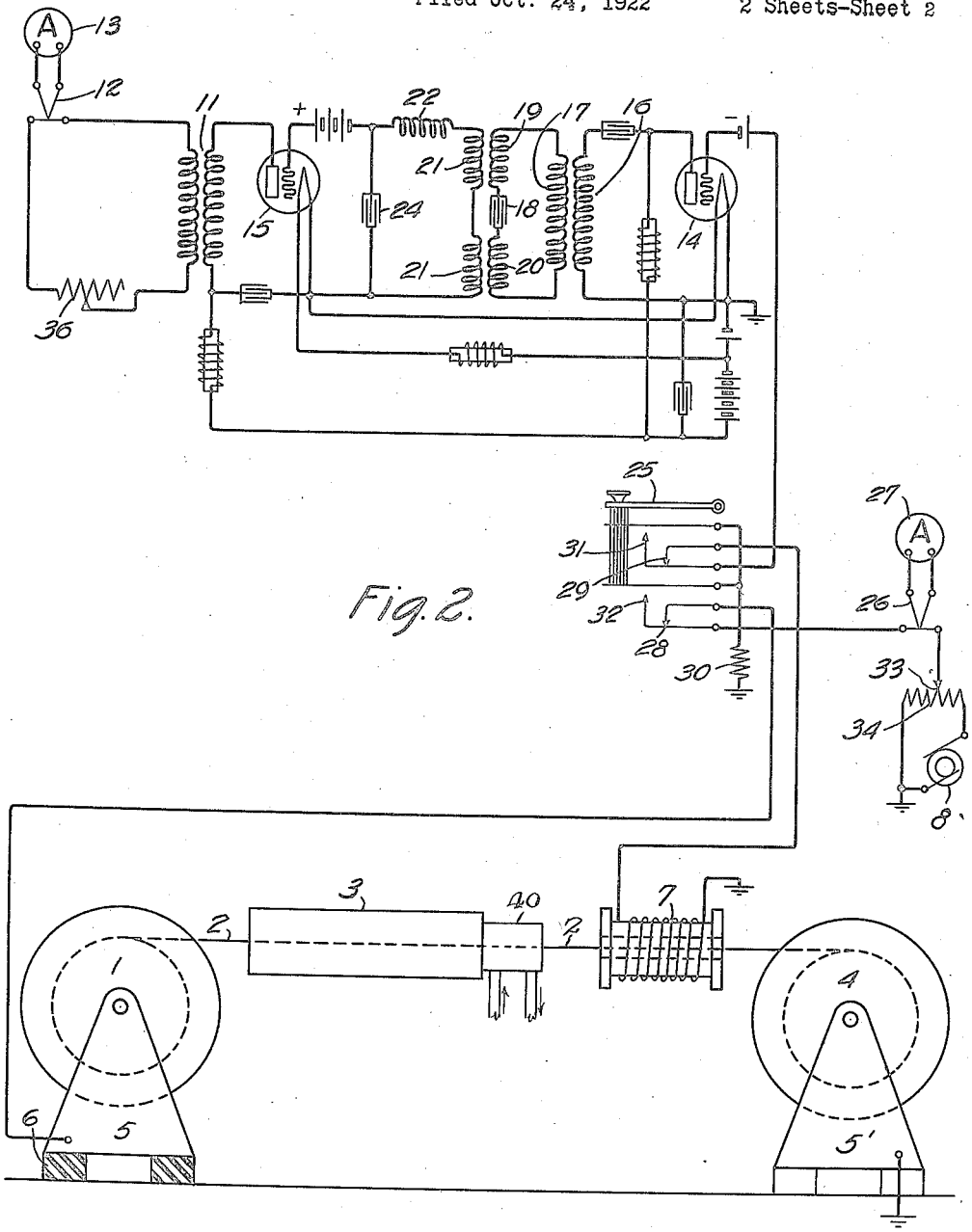

Patented June 1, 1926.

1,586,962

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

INDUCTION APPARATUS.

Application filed October 24, 1922. Serial No. 596,565.

This invention relates to induction apparatus and methods.

An object of the invention is to provide a method and apparatus to be used in making continuous measurements of the electrical or magnetic condition of a moving conductor wound spirally with magnetic wire or tape.

Another object of the invention is to provide a method and means for continuously testing the magnetic condition of an inductively loaded conductor which is being continually moved through a furnace or subjected to other treatment which affects its permeability.

Another object of the invention is to provide method and means for inducing an electromotive force in a coil or coils of wire surrounding a conductor through which a varying current flows.

As a result of an investigation recently made for the purpose of improving submarine telegraph cables, it has been discovered that a great improvement can be effected by spirally wrapping the conductor in a certain manner with wire or tape of a certain iron nickel alloy, and subjecting the wrapped conductor to a particular heat treatment. For a complete disclosure of such a cable and its advantages, reference is made to United States application of O. E. Buckley, Serial No. 492,725, filed August 16, 1921, and United States application of G. W. Elmen, Serial No. 557,928, filed May 2, 1922. As described in those applications, the signaling conductor, after the spirally laid loading material is applied, is passed slowly through a furnace, after which it is subjected to a definite cooling temperature. This heat treatment is necessary to give the loading material a high permeability at low magnetizing forces, such as are utilized in submarine signaling. The present invention has for an object the provision of a method and means for measuring the permeability of the loading material after this heat treatment to insure that it is constant and of a desired value throughout the length of the cable.

The principle upon which the measuring device of this invention, to which the name helical permeameter has been applied, operates is that the lines of magnetic induction set up in the loading material by a continuously loaded conductor of the type described, follow a helical path through the loading material. By surrounding a portion of the loaded conductor with a coil or solenoid and by sending a sustained alternating current through the conductor, lines of induction varying synchronously with the current in the wire are caused to thread through the turns of the coil and induce therein an electromotive force, the magnitude of which is determined by the strength of the current, the diameter of the conductor, the dimensions and lay of the tape, the number of turns of the coil, and the magnetic permeability of the tape. If the dimensions of the loaded conductor are known, then measurement of the current in the conductor and the electromotive force induced in the coil make it possible to determine the permeability of the tape.

The invention will be fully understood by reference to the following description and accompanying drawings in which Fig. 1 is a diagrammatic view of the circuit arrangement of one form of the invention; Fig. 2 is a diagram of a measuring system utilizing the invention; and Figs. 3 to 6 are diagrams referred to in a discussion of the theory of operation of the invention.

Referring to Fig. 1 of the drawing: There is provided a paying-out reel 1 from which the loaded conductor 2 is drawn through a treating apparatus 3, which may be a heat treating apparatus or an insulating apparatus or a device for any other form of treatment desired. When the apparatus 3 is a furnace, it is ordinarily associated with a cooling apparatus 40. 4 is a take-up reel. The reels 1 and 4 are mounted on supports 5 and 5' which are insulated by insulating blocks 6. A solenoid 7 surrounds the conductor 2 and is separately supported (the supports not being shown in the figure) so that the conductor 2 may pass continuously through the solenoid 7 as it emerges from the treating apparatus 3. An alternator 8 or other source of steady alternating current is in series with an ammeter 9. An amplifier 10, which may conveniently be of the thermionic vacuum tube type, supplies a current from its output circuit through a transformer 11, this current being controlled by the electromotive force induced in the solenoid 7. This output current flows through a thermocouple 12, there giving rise to a direct current in the ammeter 13 which may, if desired, be of the recording type.

The operation of the device is as follows: Alternating current from the source 8 flows through the circuit comprising the support 5, reel 1, conductor 2, reel 4, support 5', ammeter 9. This alternating current sets up a magnetic field around the conductor 2. If the magnetic material were applied in the form of a continuous cylinder around the conductor, the lines of magnetic induction would be closed circles coaxial with the conductor. The magnetic material is, however, in the form of a helical tape, and the lines of induction tend to follow the tape and thread through the solenoid 7 giving rise to electromotive force in the solenoid. This alternating electromotive force in turn gives rise to an alternating current in the output circuit of the amplifier 10, which through the agency of the thermocouple 12 gives rise to a direct current in ammeter 13. As the conductor 2 is passed continuously through the solenoid 7, the deflection of the ammeter 13 gives a measure of the permeability of the magnetic material around the conductor at any instant. If it is desired to have the instrument record the average over a considerable length of conductor rather than the instantaneous value of permeability at a particular point on the wire, it is only necessary to make the thermocouple 12 and the ammeter 13 so sluggish as not to respond to variations from foot to foot along the conductor, but to average automatically the permeability over a piece of conductor many feet in length.

The arrangement shown in Fig. 2 is similar to that of Fig. 1, but refinements are introduced in the amplifying and measuring circuits. Many of the return circuits are shown as completed through ground. The amplifiers 14 and 15 and their associated circuits, are of a form now commonly employed, and detail description is therefore omitted. The electrical coupling between the two amplifiers comprises transformer 16, 17 and transformer 19, 20, 21. The circuits comprising elements 17 to 24 constitute an electrical filter which transmits current of the frequency of the generator 8 with small attenuation and gives large attenuation to currents of other frequencies. It is particularly desirable to employ a filter in the amplifier circuits when the treating apparatus 3 is a furnace of the type employing heating coils supplied from an alternating current source to prevent energy from this source from affecting the indicating instrument 13.

The function of key 25 is to permit the apparatus to be tested from time to time to insure that a readjustment of the circuit is not necessary to give correct indications. In place of the ammeter 9 of Fig. 1, a thermocouple 26 and direct current ammeter 27 are normally associated with the conductor 2 through contact 28 of the key 25. The circuit from the solenoid 7 to the grid of the tube 14 is completed through contact 29 of the key 25. During the operation of the testing system the key 25 is occasionally depressed, which disconnects the coil 7 from the amplifier and associates the resistance 30 with the grid of the tube 14 through contact 31. A shunt circuit around resistance 30 is then completed through contact 32, thermocouple 26, contact 33 of potentiometer 34, and ground. By reading the ammeters 27 and 13 and knowing from previous observation what should be the reading of 13 when 27 is in any position, a correction of the instrument 13 may be made by adjustment of resistance 36 or by some other adjustment of the amplifier or other circuits; otherwise, the operation of the system of Fig. 2 is the same as that of Fig. 1.

In view of the fact that the fundamental principles involved in this method of measuring permeability are not generally understood, the theory involved will be discussed below. It should be noted that this theory is not in agreement with the commonly accepted and wide-spread idea that the lines of magnetic induction around the conductor form closed loops. If this idea were correct, the lines of induction generated by a current flowing in the helically loaded conductor could not link with the coil which is coaxial with the conductor, and the device described could not be operative.

Figure 3:
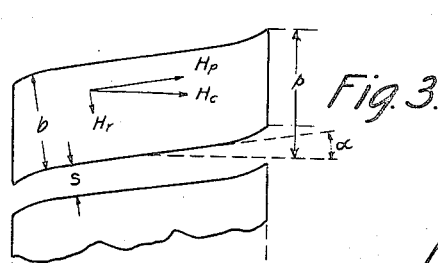

Consider a tape of thickness $t$ and width $b$ and magnetic permeability $\mu$ wound with a spacing $s$ on a conductor of such diameter that the mean radius of the tape is $a$, as shown in Fig. 3; let $p$ be the pitch and $\alpha$ the angle of advance of the winding. Then $$\cos \alpha = \frac{b+s}{p}; \tan \alpha = \frac{p}{2\pi a}; \sin \alpha = \frac{b+s}{2\pi a} \quad (1)$$

Figure 4:
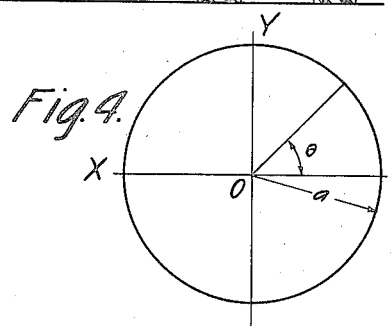
Figure 5:
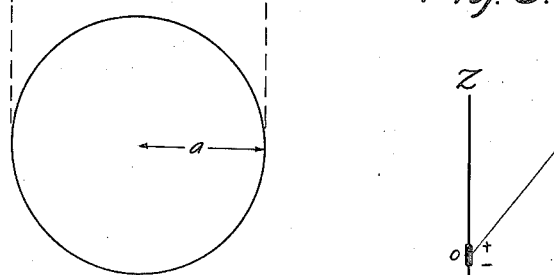
Figure 6:
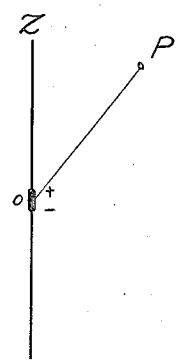

A right-handed system of Cartesian coordinates is chosen, as shown in Figs. 4 and 6, so that the Z-axis is the axis of the conductor and the point $a$, O, O is a mid-point of the space between adjacent turns of the tape. The locus of these midpoints is given by $$x = a \cos \Theta; \ y = a \sin \Theta; \ z = k\Theta, \quad (2)$$

where $$k = \frac{p}{2\pi}.$$

The magnetic field around the conductor is due to two sources:—the current in the wire and the magnetic poles induced in the tape. It may be shown that the lines of force in the tape due to the induced poles are helices orthogonal to the edges of the tape. The lines of force due to the current are circles coaxial with the conductor. The field due to the current may be resolved into two components, one parallel to the length of the tape and the other parallel to the plane of the tape but perpendicular to its length. This latter component acts in the same line in the tape as does the field due to the induced poles. Now if the permeability of the material of the tape were entirely independent of the amount and direction of the field strength the fluxes due to these components of the field could be calculated separately and their vector sum would be rigorously the induction in the tape. In the actual cable the permeability is not constant but the error made in assuming that it is constant is probably small so that the assumption will be made in the following treatment. The assumption will also be made that the spacing of the turns of the tape is small compared with the width of the tape; then the usual theorems of the magnetic circuit can be applied in computing the flux perpendicular to the length of the tape.

The magnetic field at a distance $a$ from the axis of the wire due to the current $i$ in the wire is:

$$H_0 = \frac{2i}{a} \text{(electromagnetic units)}. \quad (3)$$

This can be resolved into two components, one parallel to the length of the tape $$H_p = \frac{2i}{a} \cos \alpha \quad (4)$$

and one perpendicular to the length of the tape $$H_r = \frac{2i}{a} \sin \alpha \quad (5)$$

Due to these two components of the field there will be in the iron two components of the flux, one parallel to the tape having the value:

$$B_p = \frac{2\mu i}{a} \cos \alpha, \quad (6)$$

and the other perpendicular to the tape and having a value $B_r$ given (through the theorems of the magnetic circuit) by the following equation:

$$(b+s)\frac{2i}{a} \sin \alpha = B_r \left[\frac{b}{\mu} + s\right]. \quad (7)$$

(We may call $$\frac{b+s}{b+\mu s}$$

the effective permeability in the direction perpendicular to the length of the tape.) The corresponding values in the air gap would be:

$$B'_p = \frac{2i}{a} \cos \alpha \quad (8)$$

and $$B'_r = B_r = \frac{2\mu i}{a} \frac{b+s}{b+\mu s} \sin \alpha. \quad (9)$$

The induction at any point in the tape on the line $x=a$, $y=o$ would have the components $$B_Y = \frac{2\mu i}{a} \cos^2 \alpha + \frac{2\mu i}{a} \frac{b+s}{b+\mu s} \sin^2 \alpha \quad (10)$$

$$B_Z = \frac{2\mu i}{a} \cos \alpha \sin \alpha - \frac{2\mu i}{a} \frac{b+s}{b+\mu s} \sin \alpha \cos \alpha \quad (11)$$

In the air-gap the components would be $$B'_Y = \frac{2i}{a} \cos^2 \alpha + \frac{2\mu i}{a} \frac{b+s}{b+\mu s} \sin^2 \alpha \quad (12)$$

$$B'_Z = \frac{2i}{a} \cos \alpha \sin \alpha - \frac{2\mu i}{a} \frac{b+s}{b+\mu s} \sin \alpha \cos \alpha \quad (13)$$

The mean values of the components are $$\overline{B}_Y = \frac{bB_Y + sB'_Y}{b+s} = \frac{2\mu i}{a} \frac{\cos^2 \alpha \cdot (b + \frac{s}{\mu} + \sin^2 \alpha \cdot \frac{(b+s)^2}{b+\mu s}}{b+s} \quad (14)$$

$$\overline{B}_Z = \frac{bB_Z + sB'_Z}{b+s} = \frac{2\mu i}{a} \frac{b + \frac{s}{\mu} - \frac{(b+s)^2}{b+\mu s}}{b+s} \sin \alpha \cos \alpha \quad (15)$$

The increase in the inductance per cm. length of the conductor due to the presence of the tape is:

$$\Delta L_1 = \left(\frac{1}{i}\overline{B}_Y - \frac{2}{a}\right) t \quad (16)$$

The flux measured by the helical permeameter is:

$$\Phi = \overline{B}_Z \, 2\pi a t. \quad (17)$$

Thus from a knowledge of all of the dimensions of the conductor and of either $\Delta L_1$ or $\dfrac{\Phi}{i}$ $\mu$ can be determined, or, vice versa, knowing the dimensions and $\mu$, $\Delta L_1$ and $\dfrac{\Phi}{i}$ can be computed.

It will be evident from a consideration of the above formulas that the relations between $\mu$ and $\Delta L_1$ and between $\mu$ and $\Phi$ are quadratic equations in $\mu$, the coefficients being of a fairly involved character. In order to ascertain the possibility of obtaining simpler expressions for $\mu$ some idea of the magnitudes involved must be had. For the design of cable contemplated at present the constants are as follows:

$$b = 0.125 \text{ inch} = 0.318 \text{ cm.}$$
$$s = 0.001 \text{ inch} = 0.0025 \text{ cm.}$$
$$a = 0.092 \text{ inch} = 0.234 \text{ cm.}$$

Making the proper substitutions in equation (16), we have:

$$\Delta L_1 = \left[ \frac{2\mu}{a} \frac{\cos^2 \alpha \cdot \left(b + \dfrac{s}{\mu}\right) + \sin^2 \alpha \cdot \dfrac{(b+s)^2}{b+\mu s}}{b+s} - \frac{2}{a} \right] t. \quad (18)$$

Assuming for $\mu$ a value of 2000, equation (18) becomes:

$$\Delta L_1 = \frac{2}{a}\left[ 2000 \frac{0.952\left(0.318 + \dfrac{0.0025}{2000}\right) + 0.048 \dfrac{(0.321)^2}{0.318 + 5.08}}{0.318 + 0.003} - 1 \right] t = \frac{2}{a}\left[ 2000 \frac{0.302 + 0.001}{0.318 + 0.003} - 1 \right] t.$$

Without making an error greater than $\dfrac{1}{20}$ % we may write:

$$\mu = \frac{a \Delta L_1}{2t} \frac{b+s}{\cos^2 \alpha \cdot \left(b + \dfrac{s}{\mu}\right) + \sin^2 \alpha \cdot \dfrac{(b+s)^2}{b+\mu s}} \quad (19)$$

and without making an error greater than $\dfrac{1}{3}$ %:

$$\mu = \frac{a \Delta L_1}{2t \cos^2 \alpha} \frac{b+s}{b}. \quad (20)$$

$$\mu = \frac{\Phi}{i} \frac{1}{2\pi t \sin 2\alpha} \frac{0.318 + 0.003}{0.318 + \dfrac{0.0025}{2000} - \dfrac{(0.321)^2}{0.318 + 5.08}} = \frac{\Phi}{i} \frac{1}{2\pi t \sin 2\alpha} \frac{0.318 + 0.003}{0.318 - 0.019}.$$

So, for $\mu$ approximately 2000, within 6%

$$\mu = \frac{\Phi}{i} \frac{1}{2\pi t \sin 2\alpha} \frac{b+s}{b}, \quad (23)$$

the error being inversely proportional to $\mu$. The insertion of this approximate value of $\mu$ given by 23 in the right-hand side of 22 will give a closer approximation to the true value of $\mu$, the error being less than $$\tfrac{1}{3}\%.$$

The determination of $$\frac{\Phi}{i}$$

may be carried out by measuring separately, in any way whatever, $i$ and the electromotive force developed by a change in $\Phi$ (as in the systems of Figs. 1 and 2) and taking the ratio of the two, or in any other manner as by balancing the electromotive force developed by a change in $\Phi$ against an electromotive force produced by $i$ or a change in $i$, the ratio $$\frac{\phi}{i}$$

Making the proper substitutions in equation 17, we have:

$$\Phi = 2\pi a t \frac{2\mu i}{a} \frac{b + \dfrac{s}{\mu} \dfrac{(b+s)^2}{-b+\mu s}}{b+s} \sin \alpha \cos \alpha \quad (21)$$

or $$\mu = \frac{\Phi}{i} \frac{1}{2\pi t \sin 2\alpha} \frac{b+s}{b + \dfrac{s}{\mu} - \dfrac{(b+s)^2}{b+\mu s}}. \quad (22)$$

For $\mu = 2000$ this becomes:

being then determined from the settings of the instrument. This process, of course, is simply ascertaining the mutual inductance between the conductor 2 and the solenoid 7 by means of a suitable bridge.

Although the theory of this device has been developed and the device has been described with reference to the measurement of the permeability of a continuously loaded conductor, it is pointed out that there are other applications of substantially the same device involving the same fundamental principles. For instance, if the permeability is known and all other factors except the current flowing through the conductor are known, the device may be used to measure the current flowing through a conductor which is wrapped with a helical layer of magnetic material. In this case the device serves the purpose of a current transformer and gives a convenient means of measuring the current flowing in a conductor, such, for instance, as a large power conductor, without cutting it apart to connect apparatus. The principle may also be used in intercepting a telephone or telegraph message passing through a conductor, without cutting the conductor.

The induction apparatus of this invention may, of course, be employed to investigate any magnetic condition of the loaded conductor and at any step in the process of manufacture of the cable as, for example, after gutta-percha or rubber insulation is laid over the taped conductor.

It is obvious that the principle of this invention can be applied also in the measurement of the mutual inductance between the conductor 2 and the solenoid 7 by means of an alternating current bridge.

In certain of the following claims, the expression "layer of spirally wound magnetic wire" is used in a generic sense. That is, a layer may comprise one or more thicknesses of the material and the wire may have any desired shape of cross-section.

What is claimed is:—

1. The method of handling a conductor continuously loaded with a layer of spirally wound magnetic wire, which comprises continuously moving the conductor, applying heat from a stationary source to a part of the moving conductor, constantly applying a cooling medium to the conductor as it moves from the point of heat application and testing the magnetic condition of the conductor as it moves from the cooling point to determine whether the heating and cooling are proper in amounts.

2. The method of inductively obtaining an indication of the condition of a conductor which comprises wrapping the conductor spirally with a layer of magnetic wire, inserting the wound conductor in a solenoid, establishing a variable current in the conductor, and utilizing the electromotive force generated in the solenoid to control an indicating instrument.

3. The method of inducing an electromotive force in a secondary conductor which surrounds a primary conductor through which a varying current flows, which comprises varying the field of the main conductor to produce a flux which does not lie entirely in planes perpendicular to the primary conductor, and causing a portion at least of the resulting flux to cut the secondary conductor as the current in the primary conductor varies.

4. The method of inducing an electromotive force in a secondary conductor which surrounds a primary conductor through which a varying current flows which comprises varying the permeability of a portion of the field in such manner as to produce a flux component in a direction which does not lie entirely in planes perpendicular to the primary conductor, and causing a portion at least of the resultant flux to cut said secondary conductor as the current in the primary conductor varies.

5. The method of inducing an electromotive force in a stationary conductor from a moving conductor, the former surrounding the latter and the latter having a varying current therein, which comprises distorting the magnetic field of said varying current to produce a flux component in a direction which does not lie entirely in planes perpendicular to the primary conductor, and causing a portion at least of the resultant flux to cut the stationary conductor as the current of the main conductor varies.

6. The combination with an electric conductor, of means for establishing current therein varying in amplitude, a wire of magnetic material wound spirally upon said conductor to produce a flux which does not lie entirely in planes perpendicular to said conductor, a coil of wire surrounding a portion of said conductor and cut by a portion at least of the resultant flux.

7. The combination with a moving electrical conductor, of a wire of magnetic material wound spirally upon said conductor to produce a flux which does not lie entirely in planes perpendicular to said conductor, means for transmitting current varying in amplitude through a portion at least of said conductor, a stationary coil of wire surrounding a portion of said conductor through which varying current is flowing, and an indicating instrument controlled by the electromotive force induced in said coil or coils by the current in said conductor.

8. The combination with a moving electrical conductor having a wire of magnetic material wound spirally thereon with adjacent turns spaced apart, of a coil of wire through which said conductor moves, means for causing a varying current to flow through said conductor in and adjacent to said coil or coils and indicating means controlled by the electromotive force induced in said coil or coils by the current in said conductor.

9. The combination with an electrical cable having loading material thereon in the form of a spirally wound wire of magnetic material, of a furnace for heat-treating said magnetic material, means for feeding said conductor through said furnace, a coil of wire surrounding said moving conductor and through which it passes after being heat-treated, means for causing a varying current to flow through said conductor in and adjacent to said coil or coils, and indicating means controlled by the electromotive force induced in said coil or coils by the current in said conductor.

10. The steps in the method of preparing a conductor continuously loaded with magnetic material which comprise heating the conductor by causing a continuous relative movement of a source of heat and the conductor lengthwise of the conductor and continuously testing the magnetic condition of the conductor.

In witness whereof, I hereunto subscribe my name this 10th day of October A. D., 1922.

OLIVER E. BUCKLEY.